Jan. 11, 1966   R. T. SHEEHAN   3,228,516
EXTENSIBLE TELESCOPING BELT CONVEYOR
Filed March 27, 1963   3 Sheets-Sheet 3
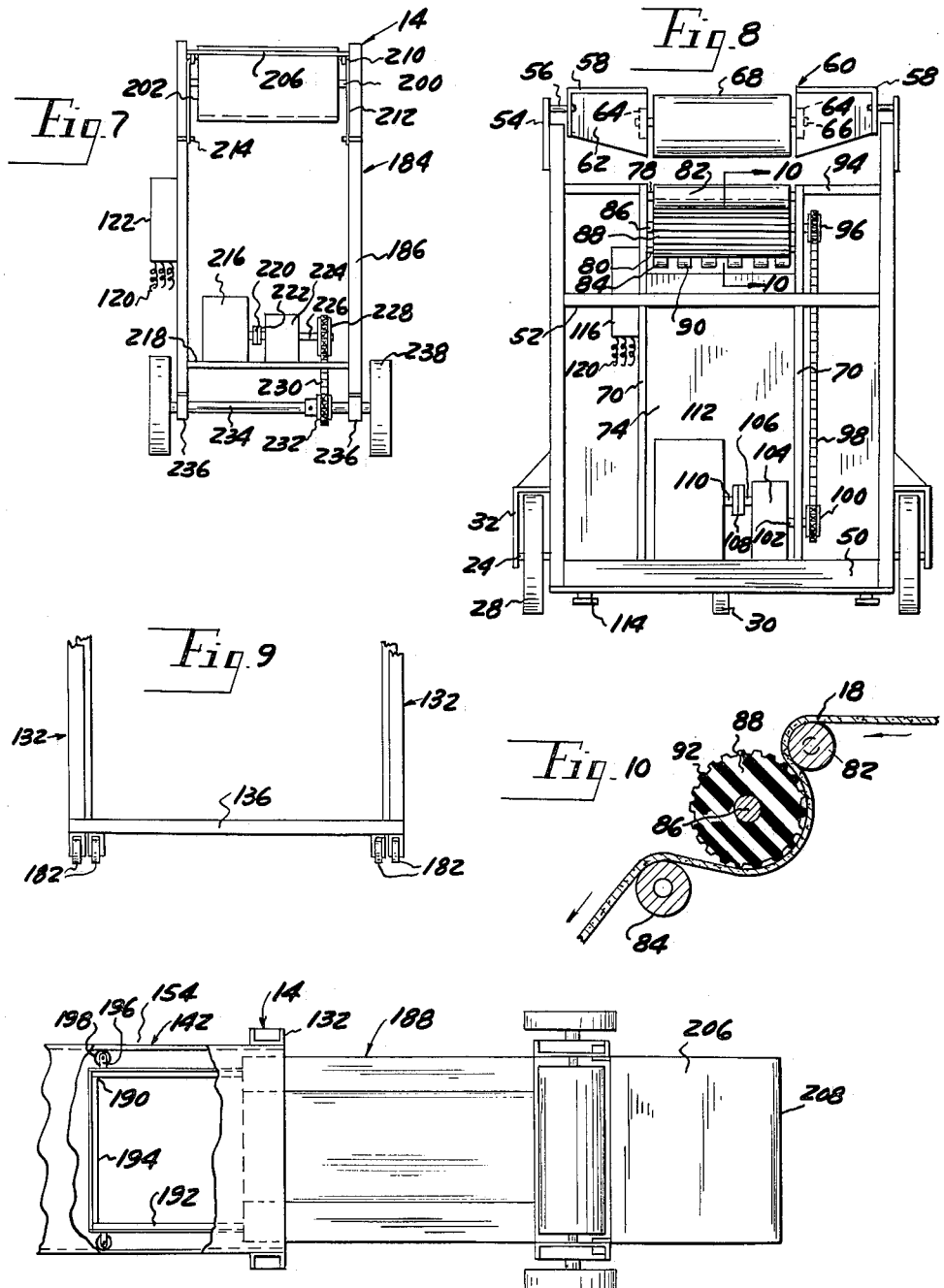
INVENTOR.
ROBERT T. SHEEHAN
BY
Barthel & Bugbee
ATTORNEYS

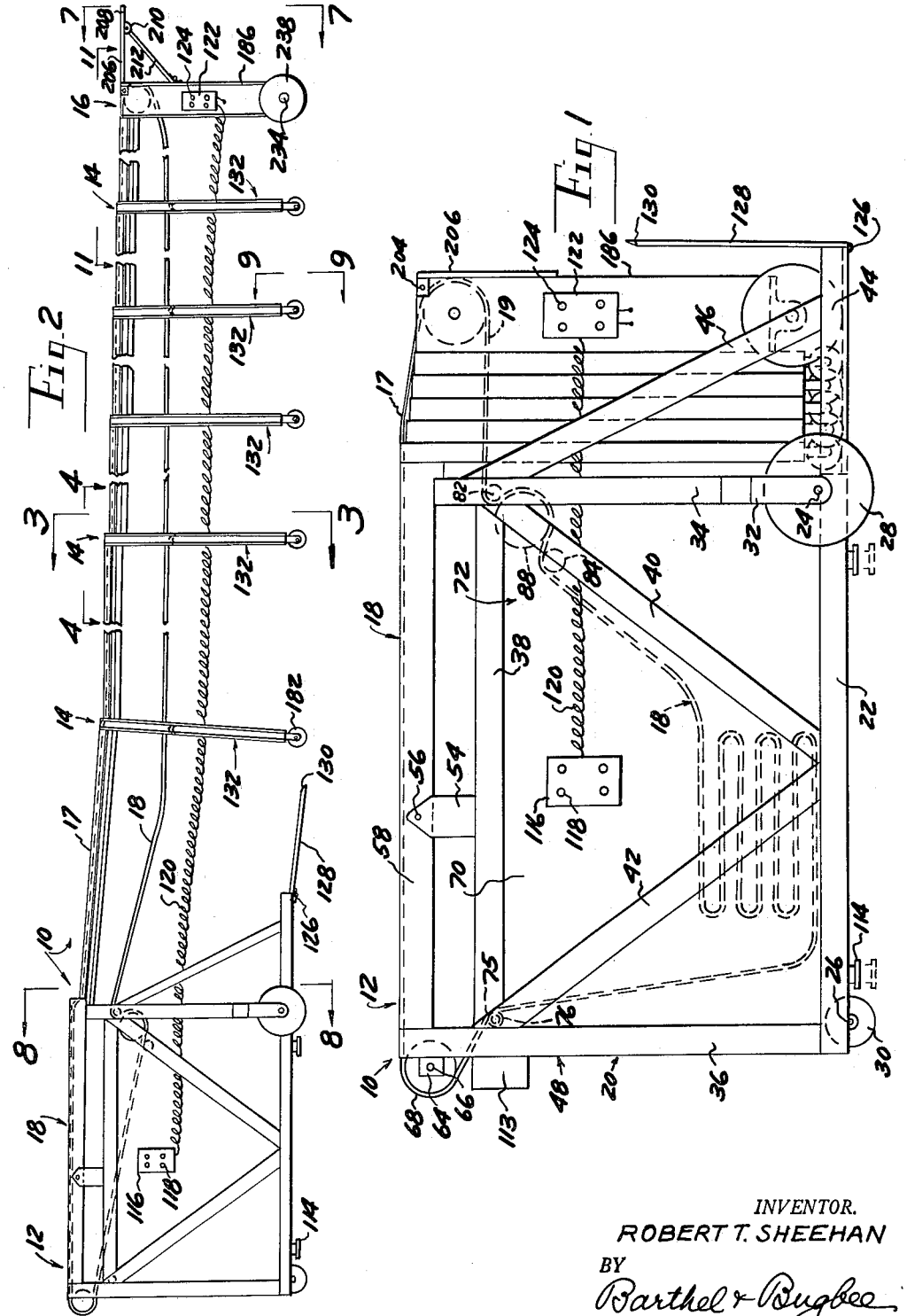

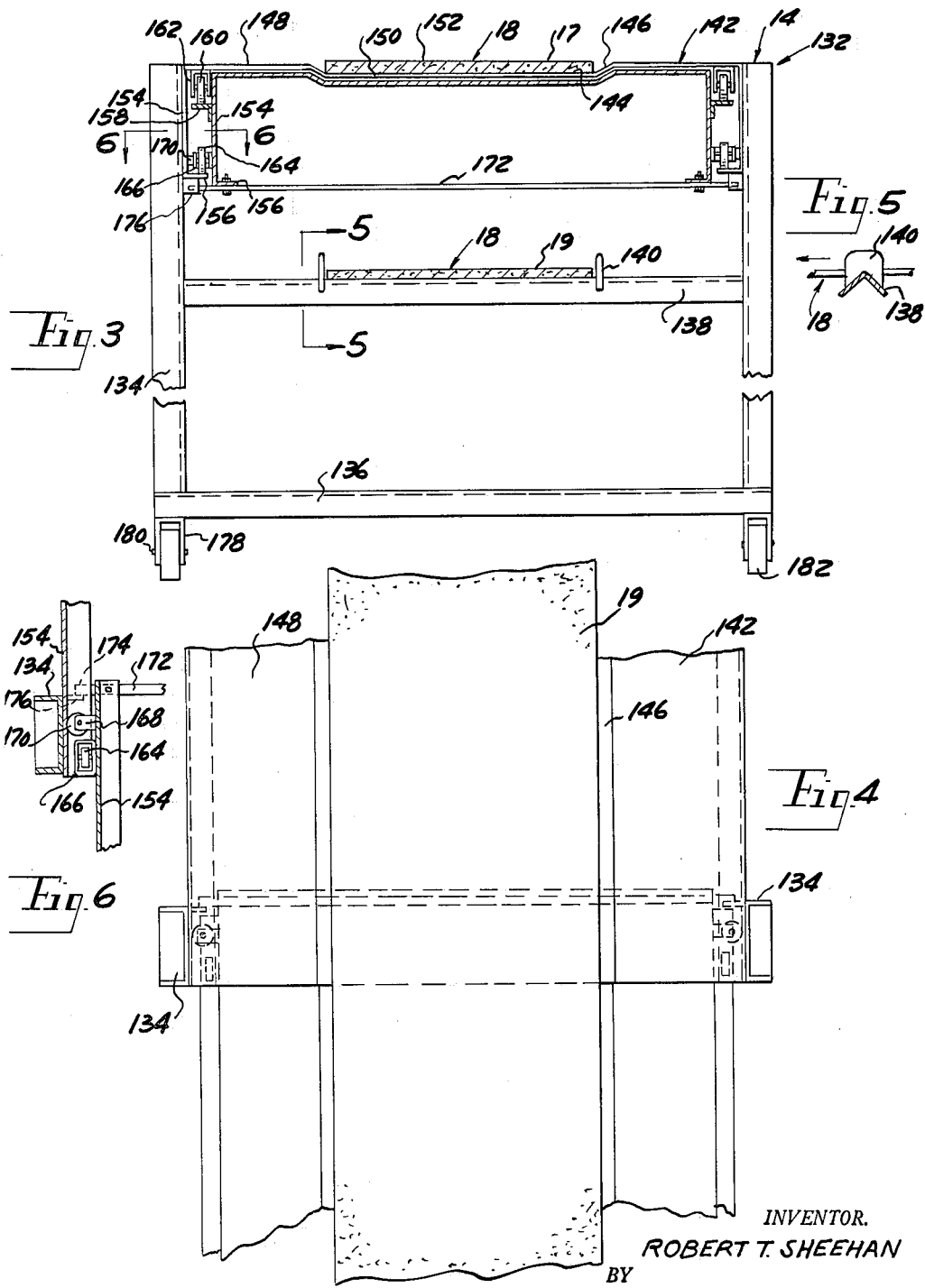

United States Patent Office 3,228,516
Patented Jan. 11, 1966

3,228,516
EXTENSIBLE TELESCOPING BELT CONVEYOR
Robert T. Sheehan, 31530 Myrna Road, Livonia, Mich.
Filed Mar. 27, 1963, Ser. No. 268,314
1 Claim. (Cl. 198—139)

This invention relates to belt conveyors and, in particular, to extensible belt conveyors.

One object of this invention is to provide an extensible telescoping belt conveyor composed of rearward, intermediate and forward conveyor-carrying cars equipped with interengaging slides and guideways constructed and arranged in telescoping relationship to one another so as to enable the overall length of the conveyor to be varied by extending or retracting the forward and intermediate cars relatively to the rearward car while any temporarily-surplus length portion of the belt is received within a bin or storage compartment in the rearward car, thereby enabling the conveyor to be instantly adapted to fit varying distances between the loading and delivery ends of the conveyor as loading or unloading of the cargo proceeds.

Another object is to provide an extensible telescoping belt conveyor of the foregoing character wherein the belt is driven by driving rolls or other rotary driving members on the rearward car adjacent the storage compartment into which the surplus length portion of the belt is deposited in superimposed undulating folds in the retracted or partially-retracted positions of the belt conveyor.

Another object is to provide an extensible telescoping belt conveyor of the foregoing character wherein the rearward or belt-driving car is provided with a tilting top which adapts itself to varying inclinations of the adjacent portions of the belt arising at different states of extension or retraction of the conveyor.

Another object is to provide an extensible telescoping belt conveyor of the foregoing character wherein the forward and intermediate cars are guided into telescoping relationship with one another so that they move smoothly relatively to one another while the conveyor is being extended or retracted, thereby requiring a minimum of effort in the performance of such extension or retraction.

Another object is to provide an extensible telescoping belt conveyor of the foregoing character wherein extension and retraction are accomplished by power-driven mechanism mounted on the forward car and preferably controlled remotely from a control station at the rearward car.

Another object is to provide an extensible telescoping belt conveyor of the foregoing character wherein the conveyor belt is driven by a corrugated driving drum, preferably of elastomeric material, such as rubber, synthetic rubber, or resilient synthetic plastic material having elastic deformable properties, so as to grip the belt itself with a firm driving engagement which at the same time permits the belt to conform loosely to the varying height levels of the intermediate and forward cars relatively to the rearward car.

Another object is to provide an extensible telescoping belt conveyor of the foregoing character wherein the rearward car is equipped with a forwardly-extending base platform and a pivoted ramp leading upwardly thereto from the adjacent ground level so as to cause the ground wheels of the intermediate and forward cars to ride up the ramp onto the platform for compact storage or transportation purposes, the ramp itself being preferably pivoted to swing upward and thereby form a forward end gate to retain the forward and intermediate cars upon the platform.

Another object is to provide an extensible telescoping belt conveyor of the foregoing character wherein the intermediate and forward cars, as well as the rearward car, are relatively short, so that the conveyor telescopes into a smaller fraction of its maximum extended length than has hitherto been provided by prior conveyors, thereby enabling the conveyor to occupy much less floor space during periods of inactivity such as in storage or transportation than has been possible in prior conveyors.

Other objects and advantages of the invention will become apparent during the course of the following description of the accompanying drawings, wherein:

FIGURE 1 is a side elevation of an extensible telescoping belt conveyor according to one form of the invention, shown in its completely retracted position;

FIGURE 2 is a side elevation on a slightly reduced scale, showing the telescoping belt conveyor of FIGURE 1 in its fully extended position;

FIGURE 3 is a cross-section through the overlapping sections of two intermediate cars taken along the line 3—3 in FIGURE 2;

FIGURE 4 is a fragmentary top plan view of the portion of the conveyor shown in FIGURE 3, looking in the direction of the line 4—4 of FIGURE 2;

FIGURE 5 is an enlarged fragmentary vertical cross-section through one of the belt-supporting cross members of an intermediate car, taken along the line 5—5 in FIGURE 3;

FIGURE 6 is a fragmentary horizontal section taken along the line 6—6 in FIGURE 3, showing details of the guiding arrangement in the overlapping portions of adjacent intermediate and forward cars;

FIGURE 7 is a front elevation of the forward car, looking in the direction of the line 7—7 in FIGURE 2;

FIGURE 8 is a front elevation, partly in section, of the rearward car, taken along the line 8—8 in FIGURE 2, with the belt omitted to disclose the underlying parts more clearly;

FIGURE 9 is a front elevation of the lower portion of one of the intermediate cars looking in the direction of the line 9—9 in FIGURE 2;

FIGURE 10 is an enlarged fragmentary vertical cross-section through the belt-driving mechanism of the rearward car, taken along the line 10—10 in FIGURE 8; and FIGURE 11 is a top plan view of the forward portion of the machine looking in the direction of the lines 11—11 in FIGURE 2.

*General construction*

Referring to the drawings in detail, FIGURE 2 shows an extensible telescoping belt conveyor, generally designated 10, according to one form of the invention as consisting generally of a rearward or main car 12 containing the conveyor belt driving and storage arrangement, intermediate cars 14 and a forward car 16 arranged in telescoping relationship with one another to support the upper and lower courses 17 and 19 of a conveyor belt 18 for various relative positions between the fully retracted position of FIGURE 1 and the fully extended position of FIGURE 2. In one type of conveyor 10, as actually constructed, the conveyor 10 is extensible from a telescoped or fully retracted overall length of 10½ feet (FIGURE 1) to a fully extended length of 48 feet (FIGURE 2) in 28 seconds.

The belt 18, which is supported by the cars 12, 14 and 16 and driven from the car 12, is preferably made of a textile fabric so as to afford not only an enhanced frictional grip by the driving rolls but also to be easily adaptable to the slightly different levels of the various cars and to fold freely in undulating layers when the conveyor 10 is partially or fully retracted. The belt 18 is mounted in such a manner as to run rather loosely, yet it carries its loads of conveyed articles or materials efficiently while undergoing very little wear. The belt 18 is caused to run while the conveyor 10 is being retracted, as is explained below in connection with the description of the operation thereof, and in so running, its excess length is fed into the storage bin in undulating folds, as described below.

*Main or rearward car construction*

The main or rearward car 12 (FIGURES 1, 2 and 8) which supports the intermediate and forward cars 14 and 16 in the retracted position of the telescoping conveyor 10 (FIGURE 1) includes a supporting framework, generally designated 20. The framework 20 includes elongated lower longitudinal members 22 rotatably supporting forward and rearward axles 24 and 26 respectively (FIGURE 2) which in turn rotatably support forward and rearward ground wheels 28 and 30. The axes 24 of the forward ground wheels 28 are supported at their outer ends by angle brackets 32 welded or otherwise secured at their upper ends to the outer sides of forward uprights 34 disposed in spaced relationship to rearward uprights 36 and connected thereto by upper longitudinal members 38. The lower and upper longitudinal members 22 and 38 are interconnected by intermediate and rearward diagonal braces 40 and 42 welded or otherwise secured thereto, and the lower longitudinal members 22 have forward extensions 44 projecting forwardly beyond the forward axles 24 and strengthened by forward diagonal braces 46.

The above-described side frame members 22, 34, 36, 38, 40, 42 and 46 are preferably channel members with inwardly-facing channels, preferably secured to one another by welding, and collectively constituting laterally-spaced parallel side frames, generally designated 48. The opposite side frames 48 are interconnected by lower and upper cross members 50 and 52 respectively (FIGURE 8) of channel or angle construction and preferably welded thereto. The rearward ground wheel 30 is a swiveling caster wheel mounted in the middle of the rearward lower cross member 50 (FIGURES 1 and 8).

Rising from the upper longitudinal members 38 approximately midway between the uprights 34 and 36 but slightly nearer the rearward uprights 36 are upstanding brackets 54 (FIGURE 1) aligned laterally with one another to receive pivot members 56 which in turn serve as trunnions pivotally supporting the laterally-spaced angle side members 58 of a tilting top structure, generally designated 60 (FIGURE 8). The rearward ends of the angle side members 58 are provided with qusset or corner plates 62 welded thereto and in turn supporting bearing blocks 64 which serve as journal bearings for rotatably supporting the axles 66 of a rearward belt-supporting drum 68 around which the belt 18 is trained at the rearward end of the main or rearward car 12.

Mounted between the side frames 48 and spaced inwardly therefrom are the spaced parallel side walls 70 of a belt storage compartment or bin, generally designated 72, having longitudinally-spaced end walls 74 extending between and secured to the lower and upper cross members 50 and 52 (FIGURE 8). Extending between the bin side walls 70 near the upper rearward corners thereof is the axle 75 of a rearward belt guide idler roller 76 which in one embodiment of the conveyor 10 consists of a piece of pipe welded at its opposite ends to the bin side plates 70 but optionally consisting of a roller rather than a stationary tubular member. From FIGURE 1 it will be seen that the belt 18 immediately below the rearward belt guide roller 68 around which it is trained, passes over the guide member 76 and downward into the interior of the belt storage bin 72.

Rotatably supported on and between the bin plates 72 near the upper forward corners thereof are the inclinedly-spaced axles 78 and 80 of upper and lower belt idler drum assemblies, generally designated 82 and 84 respectively (FIGURE 10) and similarly rotatably mounted on the side plates 70 between the idler rollers 82 and 84 is the axle 86 of a ribbed or corrugated belt-driving roller or drum 88. The lower forward idler roller 84 consists of multiple wheels 90 spaced axially apart from one another (FIGURE 8). The wheels 90 and the driving drum 88 are preferably made of elastomeric material, such as rubber, synthetic rubber, resilient synthetic plastic or the like. The longitudinally-extending circumferentially-spaced corrugations or ribs 92 on the driving drum 88 provide a firm driving grip or purchase upon the conveyor belt 18 as it passes between the upper and lower idler rollers 82 and 84 around the periphery of the driving drum 88 (FIGURE 10). The upper forward corner portions of the side plates 70 are connected to their respective side frames 48 by horizontal brace members 94 welded or otherwise secured therebetween (FIGURE 8).

One end of the axle 86 of the driving drum 88 projects laterally beyond its respective side plate 70 (FIGURE 8) and carries a driven sprocket 96, keyed or otherwise drivingly secured thereto. Drivingly engaging the driven sprocket 96 is an endless drive chain 98 trained around a drive sprocket 100 keyed or otherwise drivingly secured to the output shaft 102 of a speed reduction gear box 104, the input shaft 106 of which is coupled at 108 to the output shaft 110 of a reversible electric belt-driving motor 112. The motor 112 and speed reduction gear box 104 are mounted upon the lower frame cross members 50 near the forward ends of the bin side plates 70. The energization of the motor 112 is controlled by a conventional push-button-operated motor control box 113 in circuit therewith.

In order to immobilize the rearward or main car 12 while the conveyor 10 is in operation, the car 12 is provided with four conventional vertically-movable floor stops 114 shown diagrammatically in FIGURES 1, 2 and 8 and mounted near the corners of the framework 20. These stops 114 are movable from their solid line positions of FIGURE 1 into the dotted line positions thereof when it is desired to raise the ground wheels 28 and caster wheel 30 slightly off the ground or floor in order to temporarily prevent shifting of the main car 12 during operation. When it is desired to move or transport the conveyor 10, however, the floor stops 114 are raised into their solid line positions so as to permit the wheels 28 and 30 again to rest on the ground or floor and roll therealong. Mounted on one of the side plates 70 of the belt storage bin 72 is a conventional forward car motor control box 116 of the push button control type having motor control push buttons 118 and three flexible extensible multiple conductor control cables 120 disposed side by side and extending forwardly therefrom to a cooperating motor control box 122 with push buttons 124 and mounted on the forward car 16 to control the propelling motor thereof, as more fully described below. Hingedly secured at 126 to the forward ends of the extensions 44 of the side frame longitudinal members 22 is a vertically-swinging ramp 128 in the form of a steel plate having a beveled forward edge portion 130 for facilitating the rolling upward thereon of the ground wheels of the intermediate cars 14 and forward car 16 from the extended position of FIGURE 2 to the retracted position of FIGURE 1, as described more fully below.

*Intermediate car construction*

The intermediate cars 14 are of generally similar construction except for slightly and progressively varying heights and widths in order to telescope relatively to one another, as shown in FIGURE 1, hence a single description and similar reference numerals will suffice for all such cars 14. Each intermediate car 14 includes a supporting frame, generally designated 132, consisting of laterally-spaced outwardly-facing parallel uprights 134 (FIGURES 3 and 4) interconnected by vertically-spaced lower downwardly-facing channel members 136, intermediate downwardly-facing angle members 138 arranged in an inverted V-shaped position (FIGURE 5) with upstanding laterally-spaced belt guides 140 welded thereto and top plates 142, the members 136, 138 and 142 being welded or otherwise secured at their opposite ends to the uprights 134. The top plate 142 is provided with a central longitudinally-extending flat-bottomed depression 144 slightly wider at the top than the conveyor belt 18 and having sloping or downwardly-inclined surfaces 146 leading downwardly thereto from the lateral portions 148 of the top plate 142 and adapted to urge the belt 18 downwardly into the depression 144 and maintain it there with its lower surface 150 resting in the depression 144 while its upper surface 152 projects slightly above the level of the lateral portions 148 of the top plate 142.

Each top plate 142 is actually of approximately channel cross-section with laterally-spaced parallel side walls 154 integral with and extending downwardly from the lateral portions 148 and terminating at their lower edges in inwardly-turned flanges 156 (FIGURES 3 and 6). The side walls 154 and the uprights 134 are welded to one another in face-to-face relationship. As seen from FIGURES 3, 4 and 6, each channel top plate 142 telescopes into a slightly wider and broader channel top plate 142 rearward of it and in turn telescopingly receives a narrower and slightly shallower top plate 142 projecting rearwardly from the intermediate car 14 in front of it. In order to facilitate this telescoping action, the side walls 154 carry angle rails 158 welded to the outer surfaces thereof and serving as tracks for rolling engagement by upper horizontal anti-friction rollers 160, the horizontal axes of which are rotatably supported in channel brackets 162 welded to the under sides of the lateral portions 148 of the top plates 142 adjacent their respective side walls 154. The rolling engagement just described is enhanced by lower horizontal anti-friction rollers 164, the horizontal axes of which are rotatably supported in open-ended box section brackets 166 (FIGURE 6) likewise welded to the outer surfaces of the side walls 154 near the rearward ends thereof at such levels as to cause the lower rollers 164 to roll upon the upper surfaces of the flanges 156.

For further guidance during the telescoping action just mentioned above, the side walls 154 near their rearward ends carry vertically-arranged channel section brackets 168 welded thereto (FIGURE 6) and rotatably supporting the vertical axles of vertical anti-friction rollers 170. Bolted or otherwise secured to the flanges 156 at their rearward ends are stop bars 172 (FIGURES 3 and 6), the outer ends 174 of which project laterally into engageability with stop blocks 176 welded or otherwise secured to the adjacent side walls 154 of the top plate 142 telescoping therewith near the forward end of the said side wall 154. This arrangement prevents uncoupling of the intermediate cars 14 from one another or from their immediately adjacent main or rearward car 12 or forward car 16, as the case may be. Welded or otherwise secured to the lower ends or bottoms of the supporting frames 132 at varying lateral distances from the uprights 134 (FIGURES 3 and 9) in order to fit side by side with one another during telescoping are channel brackets 178 receiving the horizontal axles 180 of ground wheels 182 upon which the intermediate cars 14 roll and are supported during operation, and also during extension or retracting.

*Forward car construction*

The forward car 16 includes a supporting frame, generally designated 184 (FIGURES 1, 2, 7 and 11) having outwardly-facing relatively broad channel-section uprights 186 spaced laterally apart from one another closer together than any of the uprights 134 of the supporting frames 132 of the intermediate cars 14 in order to telescope with the foremost intermediate car 14. Secured to the channel members or uprights 186 at their upper ends is a shallower and narrower channel top plate 188 of similar construction to the top plates 142 described above (FIGURE 11) and telescoping therewith in the manner previously described above. Secured to the rearward end of the top plate 188 and extending rearwardly therefrom into the top plate 132 of the next adjacent intermediate car 14 is an outrigger guide frame 190 consisting of parallel side members 192 having their forward ends welded or otherwise secured to the rearward end of the top plate 188 and having their rearward ends interconnected by a cross member 194. The members 192 and 194 are conveniently of angle cross-section. Welded or otherwise secured to the rearward end portions of the longitudinal members 192 are the vertical channel brackets 196 which rotatably support the vertical axles of vertical antifriction rollers 198. The rollers 198 rollably engage the inner surfaces of the side walls 154 of the top plate 132 to impart additional guidance to the top plate 188 during telescoping action.

Journaled in the upper end portions of the uprights 186 of the supporting frame 184 are the opposite ends of an axle or shaft 200 which rotatably supports a forward belt idler drum 202 (FIGURE 7) which cooperates with the rearward belt-supporting drum 68 to give guidance and support to the belt 18. Also pivotally mounted as at 204 upon the upper end portions of the uprights 186 is the rearward end of a delivery plate 206 (FIGURES 1, 2 and 11), the forward end portion 208 of which carries ears 210 welded to its lower surface and pivotally supporting the upper ends of inclined struts 212, the lower ends of which are secured to the bolts or pins 214 (FIGURE 7) projecting inwardly from the uprights 186. In this manner, the delivery plate 206 receives the articles deposited thereon from the forward portion of the conveyor belt 18 and the articles thus deposited drop off the forward portion 208 thereof onto the subsequent loading conveyor or other receiving surface, according to the particular use to which the telescoping conveyor 10 is put.

The forward motor control box 122 is mounted upon one of the uprights 186, and is connected to the rearward motor control box 116 by the three flexible and extensible cables 120, as previously stated. The forward motor control box 122 is in turn wired to a reversible electric forward car propelling motor 216 (FIGURE 7) mounted upon a lower cross member or platform 218 and having its output shaft 220 coupled to the input shaft 222 of a speed reduction gear box 224. Keyed or otherwise drivingly secured to the output shaft 226 of the gear box 224 is a drive sprocket 228 which is drivingly connected by a sprocket chain 230 to a driven sprocket 232. The driven sprocket 232 is keyed or otherwise drivingly secured to a live axle 234 journaled in bearing blocks 236 mounted on the lower ends of the uprights 186 and having ground wheels 238 drivingly connected to the outer ends of the axle 234.

*Operation*

In the operation of the telescoping belt conveyor 10, let it be assumed that the conveyor is in its retracted condition shown in FIGURE 1 and that it is desired to extend it for a loading operation. In the retracted position shown in FIGURE 1, the operator lowers the ramp 128 and depresses the proper push button 118 or 124 of either the rearward or forward motor control box 116 or 122, setting the propelling motor 216 in a forwardly-rotating direction, causing the axle 234 and ground wheels 238 to be rotated in a clockwise direction (FIGURES 1 and 2). This action propels the forward car 16 outward to the right down the ramp 128 from the extensions 44 of the longitudinal members 22 of the main car 12, towing the intermediate cars 14 behind it as each stop bar 172 engages its respective stop block 176 as each channel top plate 142 or 188 reaches the end of its path of travel out of telescoping relationship with the top plate immediately behind it.

While this is occurring, the operator has also set the belt driving motor 112 in operation, causing the conveyor belt 118 to move in a forward direction with its upper course 17 proceeding forwardly and its lower course 19 becoming extended and likewise unfolding as the belt-driving roller 88 grips the belt 18 during its clockwise rotation (FIGURES 1 and 2). Thus, the overlapping folds of the lower course 19 of the belt 18 shown in the bottom of the bin 72 in FIGURE 1 disappear into the extended position thereof shown in FIGURE 2. The operator then lines the delivery plate 206 of the conveyor 10 up with the place of deposit of the conveyed articles, such as sacks of material or boxes, whereupon he lowers the floor stops 114, raising the ground wheels 28 and caster wheel 30 of the main or rearward car 12 off the floor or ground and thus anchors the car 12 in a temporarily immovable position.

Meanwhile, the tilting top structure 58 adjusts itself by rocking on its trunnions 56 to the changing positions and levels of the top course 17 of the conveyor belt 18 as the forward and intermediate cars 16 and 14 move forward to the right away from the rearward car 12. The articles to be conveyed are now placed on the portion of the top course 17 of the conveyor belt 18 lying upon the top structure 58 of the rearward or main car 12, whence they are conveyed by the rapidly moving belt 18 to the front car 16 and deposited upon the delivery plate 206 thereof. Succeeding sacks, boxes or the like push the preceding ones off the forward portion 208 of the delivery plate 206 onto the receiving surface (not shown).

To retract the conveyor 10 from the extended position of FIGURE 2 to the telescoped position of FIGURE 1, the operator reverses the foregoing procedure by pressing the appropriate switch button 118 or 124 to reversibly rotate the propelling motor 216 and cause counterclockwise rotation of the ground wheels 238 of the forward car 16. The latter then moves to the left, telescoping its top plate 188 into the next preceding top plate 142 of the next preceding intermediate car 14, this in turn telescoping into the next preceding intermediate car 14 and so forth in succession until the rearmost intermediate car 14 is engaged and its wheels 182 caused to ascend the ramp 128 onto the extension 44 of the lower longitudinal member 22 of the main car 12. The remaining intermediate cars 14 and the forward or propelling car 16 follow in succession, whereupon the operator lowers the delivery plate 206 to a vertical position and raises the ramp 128 likewise to a vertical position (FIGURE 1). Meanwhile, the surplus length of the lower course 19 of the belt conveyor 18 is deposited by the belt driving drum 88 and guide rollers 82 and 84 in overlapping folds as shown in dotted lines in FIGURE 1, whereupon the operator halts the belt driving motor 112 and the propelling motor 216. The parts then occupy the relative positions shown in FIGURE 1. The operator then raises the floor stops 114, thereby lowering the ground wheels 28 and caster wheel 30 of the main car 12 upon the floor or ground. In this position, the conveyor 10 is easily moved from place to place to any desired location.

What I claim is:

An extensible telescoping belt conveyor, comprising rearward, intermediate and forward conveyor-carrying cars disposed in tandem relatively to one another and having ground wheels rotatably mounted on the lower portions thereof, said cars having frames with substantially horizontal conveyor belt-supporting structures on the upper portions thereof including substantially horizontal mutually interengaging slides and guideways disposed longitudinally thereon in telescoping relationship with one another, said frames also having laterally-spaced uprights secured at their upper ends to said belt-supporting structures and extending downwardly therefrom into close proximity to the ground with said ground wheels rotatably mounted on the lower ends of said uprights, said rearward car frame having a belt storage compartment therein beneath its respective belt-supporting structure, rotary conveyor belt-carrying members rotatably mounted on the frames of said rearward and forward cars, an endless flexible conveyor belt trained around said belt-carrying members and having an upper course extending therebetween along said belt-supporting structure and having a lower course extending therebetween through said frames into said belt storage compartment, a rotary belt-driving member drivingly engaging said belt, a motor operatively connected to said belt-driving member, a forward car-propelling motor mounted on said forward car and drivingly connected to the ground wheels thereof and propelling said forward and intermediate cars toward and away from said rearward car, a propelling motor remote control box mounted on said rearward car, and extendible flexible electrical current supply cables extending from said motor control box to said forward car propelling motor, whereby the operator from the rearward car may remotely advance and retract the intermediate and forward cars relatively to the rearward car.

References Cited by the Examiner

UNITED STATES PATENTS

| | | | |
|---|---|---|---|
| 1,453,393 | 5/1923 | Jessen | 198—139 X |
| 1,749,407 | 3/1930 | Beach | 226—181 X |
| 2,326,098 | 8/1943 | Kimmich | 198—203 |
| 2,576,217 | 11/1951 | Eggleston | 198—139 |
| 2,815,849 | 12/1957 | Zumbrunnen | 198—139 |
| 3,006,454 | 10/1961 | Penn | 198—233 X |

FOREIGN PATENTS

| | | |
|---|---|---|
| 300,411 | 2/1916 | Germany. |
| 399,120 | 9/1933 | Great Britain. |

SAMUEL F. COLEMAN, *Primary Examiner.*

EDWARD A. SROKA, *Examiner.*